(12) United States Patent
Luker (10) Patent No.: US 10,706,654 B2
(45) Date of Patent: Jul. 7, 2020

(54) WORKSITE INGRESS/EGRESS SYSTEM

(71) Applicant: Paul K Luker LLC, Carthage, TX (US)

(72) Inventor: Paul Kimbel Luker, Carthage, TX (US)

(73) Assignee: Paul K. Luker LLC, Houston, TX (US)

( * ) Notice: Subject to any disclaimer, the term of this patent is extended or adjusted under 35 U.S.C. 154(b) by 0 days.

(21) Appl. No.: 15/561,019

(22) PCT Filed: May 23, 2016

(86) PCT No.: PCT/US2016/033844
§ 371 (c)(1),
(2) Date: Sep. 22, 2017

(87) PCT Pub. No.: WO2016/154636
PCT Pub. Date: Sep. 29, 2016

(65) Prior Publication Data
US 2018/0047237 A1 Feb. 15, 2018

Related U.S. Application Data

(60) Provisional application No. 62/137,004, filed on Mar. 23, 2015.

(51) Int. Cl.
*G07C 9/00* (2020.01)
*G06Q 10/10* (2012.01)
(Continued)

(52) U.S. Cl.
CPC ..... *G07C 9/00904* (2013.01); *G06Q 10/1091* (2013.01); *G07C 9/00309* (2013.01);
(Continued)

(58) Field of Classification Search
CPC ...... G07C 9/00904; G07C 9/025; G07C 9/27; G07C 9/28
(Continued)

(56) References Cited

U.S. PATENT DOCUMENTS

2006/0059365 A1* 3/2006 Harper ............... G06F 21/6245
713/186
2007/0159297 A1 7/2007 Paulk et al.
(Continued)

OTHER PUBLICATIONS

Copenheaver, B.R., International Search Report for International Patent Application No. PCT/US2016/033844, dated Sep. 1, 2016, 2 pages, European Patent Office.

*Primary Examiner* — Vernal U Brown
(74) *Attorney, Agent, or Firm* — Buss & Benefield PLLC; Brian K. Buss (57) ABSTRACT

The invention provides a worksite ingress/egress system for an enclosed worksite with a locked gate capable of being unlocked by an actuator upon receipt of a travel signal communicated via a communications network from an access computer system operating an access authorization system in communications with an identification system. Identification system comprises a reader configured to read a personal token presented by an individual seeking passage through locked gate. Access authorization system sends a pass signal to actuator after a successful parity check between data of a worksite criteria file and data related to said individual, the employer, and worksite.

1 Claim, 10 Drawing Sheets

(51) Int. Cl.
*G07C 9/15* (2020.01)
*G07C 9/27* (2020.01)
*G07C 9/28* (2020.01)

(52) U.S. Cl.
CPC ............... *G07C 9/15* (2020.01); *G07C 9/27* (2020.01); *G07C 9/28* (2020.01); *G07C 2009/00396* (2013.01)

(58) Field of Classification Search
USPC ........................................................ 340/5.6
See application file for complete search history.

(56) References Cited

U.S. PATENT DOCUMENTS

| | | |
|---|---|---|
| 2007/0185646 A1 | 8/2007 | Neugebauer et al. |
| 2008/0120243 A1* | 5/2008 | Lakin .................... G06Q 10/10 705/72 |
| 2010/0079237 A1 | 4/2010 | Falk et al. |
| 2011/0071929 A1 | 3/2011 | Morrison |
| 2011/0231670 A1* | 9/2011 | Shevchenko ....... H04L 63/0815 713/189 |
| 2013/0214898 A1 | 8/2013 | Pineau et al. |
| 2014/0298398 A1 | 10/2014 | Neely |
| 2015/0339871 A1* | 11/2015 | Wagner .............. G07O 9/00007 340/5.81 |

* cited by examiner

WORKSITE INGRESS/EGRESS SYSTEM

This application claims the benefit of U.S. Provisional Patent Application 62/137,004 filed Mar. 23, 2015.

TECHNICAL FIELD

The present invention relates to privileged access and individual entry or exit registers. In particular, the present invention relates to locking gate system capable of granting or denying an individual access to a facility or worksite, including but not limited to buildings, laboratories, manufacturing facilities, refineries, wellhead sites, port facilities, ship yards, repair facilities and railroad yards, based upon presentment of at least a personal token to conduct a comparison of user defined criteria against select data linked to said personal token.

BACKGROUND ART

In the simplest form, business owners that seek to restrict access to facilities or worksites usually employ a locked door or gate and provide a limited number of keys to authorized individuals to allow ingress/egress. Such a system becomes unwieldy in the tracking of keys and authorized individuals if more than about three authorized individuals are given keys. In other situations, business owners may employ a guard stationed at the locked door or gate to interrogate an individual to determine if entry is authorized. Interrogation by a guard can be as simple as visual observation of a badge or more complex such as comparing the responses of an individual to a user defined list of authorized responses. The amount of time taken to observe badges or interrogate/compare responses of an individual can have an adverse impact upon production, especially when a number of individuals are at the locked door/gate seeking access to the facility, worksite or a portion thereof. Personal identification number (PIN) pads, bar coding, and radio frequency identification (RFID) technology overcome the problems with duplicative keys and interrogation/comparison systems but each rely upon preauthorization of the individual. For example, an employer will not configure and issue a badge or PIN unless the employee meets the training requirements and/or qualifications of an employer, general contractor or regulatory agency. Thereafter, the badge and/or PIN represents authorization to pass through a locked door or gate even if there is a lapse in the employee's training or qualifications. In short, the badge represents a "snapshot" of authorization that becomes less reliable with the passage of time.

Furthermore, a business entity which owns a facility or worksite ("property owner") will require other business entities in the role of contractor, subcontractor or vendor will require such entities to meet: (1) relevant federal and state regulations; (2) the property owner's policies regarding health, safety, environment and employment; (3) recommended guide lines of non-governmental organizations; (4) contractual requirements; (5) insurance requirements or a combination thereof ("hereinafter Worksite Requirements"). In turn, employees, independent contractors, and consultants of a contractor, sub-contractor or vendor will be required to meet or satisfy Worksite Requirements that are applicable to individuals. Typically Worksite Requirements are set forth in the terms of an employment agreement, contract or master service agreement. However, implementation and verification of compliance with Worksite Requirements is a daunting task given the number of requirements, length of work to be performed at a worksite, number of individuals at a worksite and the mobility of workers between employers. Failure to implement or verify compliance may result in personal injury, death, property damage, interruption of business, penalties, fines or a combination thereof.

Attempts have been made to solve these problems. The most rudimentary solution being a shift, by policy or contract, the burden of complying with Worksite Requirements to individual departments within a company or the company's contractors/vendors. However, shifting the burden of compliance does not necessarily mean that compliance will occur. And even if company policy or contractual terms require verification of compliance—such verification is typically a cursory review of a variety of documents from a wide variety of sources.

While some have attempted to automate the process of verification and compliance, the frequency is usually once or twice during the duration of a contract or on a yearly basis. Yet, none provide a guard or "gatekeeper" at a worksite to allow or prohibit individuals from entering a worksite based upon Worksite Requirements. For example, U.S. Pat. No. 6,049,776 invented by Donnelly discloses a human resource management system for staffing projects with various workers. While the Donnelly's system does provide some record keeping and tracking—it is a very limited system that does not provide a gatekeeper to allow or prevent access to a facility/worksite based upon Worksite Requirements. Nor does the Donnelly system provide a means to control a worker's access to a worksite (or a portion thereof) based on the worker's relationship to a contractor, sub-contractor, vendor or a combination thereof. The same is true for the system disclosed in U.S. Pat. No. 8,660,876, invented by Woodings et al. Furthermore, these systems are "snapshot" systems only capable of generating a condition or status report based on data and queries entered into the system only once or twice a year. The disclosed system in one embodiment, efficiently and quickly interrogates and compares the records about the individual, and his/her employer against the requirements of the facility or worksite at the time of presentment of a personal token to signal access and unlock the door or gate or signal denial of access. In short, the present invention, among other aspects, shifts and transforms the verification and authorization from a "snapshot" pre-authorized access method and system (not unlike the key or PIN) to a real time verification and authorization method and system utilized in part at the threshold of a locking gate.

DISCLOSURE OF INVENTION

Embodiments of the present invention as disclosed herein are illustrative and non-limiting solutions to overcome the above disadvantages and other disadvantages not described above. Furthermore, the present invention is not necessarily required to and may not overcome any of the disadvantages described above.

It is a goal of the present invention to provide immediate onsite verification that the policies of an employer are complied with before an employee is allowed ingress to or egress from a worksite. It is another goal of the present invention to provide immediate onsite verification that the terms of a contract (like a master service agreement) between a company and a contractor (or subcontractor or vendor) area complied with before allowing an employee, contract worker, contractor or vendor to enter or exit a worksite. It is yet another goal of the present invention to provide immediate onsite verification that insurance is in place, the terms of the insurance policy are met, or a combination thereof before a contractor (or subcontractor or vendor) or worker (as an employee or a contract employee) moves into or from a worksite. A key goal of the present invention is to ensure that employees, contract workers, contractors, sub-contractors and vendors meet critical criteria before ingress permission is granted to enter a worksite. It is another key goal of the present invention to ensure that employees, contract workers, contractors, sub-contractors and vendors meet critical criteria before egress permission is granted to exit a worksite, such as whether decontamination procedures have been complied with. It is a further goal of the present invention to provide immediate onsite verification of compliance with regulatory and worksite/facility requirements before a contractor (or subcontractor or vendor) or worker (be he/she an employee or contract employee) moves into or from a worksite. It is another goal of the present invention to provide immediate onsite verification of a person's identity, security clearance (if required), training, qualifications, and medical condition as a prerequisite to entering or leaving a worksite. It is yet another goal of the present invention to grant or deny ingress or egress to a worksite/facility based on user defined criteria. It is a further goal of the present invention to allow a contractor, sub-contractor, vendor or person to enter, update and track relevant information based on access permiss- ion(s) to such information. It is another goal of the present invention to create a Unique Individual Identifier ("UII") based on physiological characteristics, behavioral characteristics, personal identification number, badge or a combination thereof to be used for authentication and worksite access of an individual onsite or otherwise. It is yet a further goal of the present invention to create a Unique Business Entity Identifier ("UBEI") based upon general business entity general data, business and entity role identifier to be used for verification and worksite access pass/fail of an individual onsite or otherwise. It is yet another goal of the present invention to create a Unique Regulatory Identifier ("URI") based upon regulatory agency general data and regulatory provisions to be used for verification and worksite access pass/fail of an individual onsite or otherwise. It is another goal of the present invention to create a Unique Policy Identifier ("UPI") based upon policy general data and policy provisions to be used for verification and worksite access pass/fail of an individual onsite or otherwise. It is another goals of the present invention to create a Unique Non-Governmental Organization ("NGO") Identifier ("UNI") based upon NGO general data, and NGO guideline provisions to be used for verification and worksite access pass/fail of an individual onsite or otherwise. It is another goal of the present invention to create a Unique Contract Identifier ("UCI") based upon contract general data and contract general provisions to be used for verification and worksite access pass/fail of an individual onsite or otherwise. It is yet another goal of the present invention to create a Unique Insurance Identifier ("UINI") based upon general insurance data and insurance clauses to be used for verification and worksite access pass/fail of an individual onsite or otherwise. Yet another goal of the present invention is to create a Unique Employment Identifier ("UEI") based upon employment general data. Yet another goal of the present invention is to create a Unique Worksite Identifier ("UWI") based upon worksite general data to be used for verification and worksite access pass/fail of an individual onsite or otherwise. It is yet a further goal of the present invention to allow a person to schedule, undergo training, obtain certification, record training and/or certification or a combination thereof. It is yet another goal of the present invention to associate a personal token with a UII, UBI, URI, UPI, UNI, UCI, UINI, UEI and UWI to be used for verification and worksite access pass/fail of an individual onsite or otherwise. It is a further goal of this invention to create and distribute a record of worksite access and denial.

BEST MODE FOR CARRYING OUT INVENTION

The preferred worksite ingress/egress system 10 contemplates an enclosed worksite 01 with a locked gate 13 capable of being unlocked by an actuator 133 upon receipt of a travel signal 14 communicated via a communications network 17 from an access computer system 15 operating an access authorization system 30 in communications with an identification system 20. See FIG. 1. In particular access authorization system 30 sends a pass signal 140 after a successful parity check between data of a worksite criteria file 3602 and data of a contract file 3452, business entity summary file 2304, individual summary file 2209, employment file 3552 or a combination thereof maintained in one or a variety of databases 3100, 3150, 3200, 3250, 3300, 3350, 3400, 3450, 3500, 3550 and 3800. Identification system 20 comprises a reader 210 configured to read a personal token 200. See FIG. 1.

Selection of an appropriate worksite criteria file 3602 is based upon an access computer system 15 receiving a reader unique identifier 218 via a communication network 17 from a reader 210 located at, in or near a threshold to a locking gate 13 upon presentment of a personal token 200 by an individual seeking passage through locked gate 13. See FIG. 1. Selection of an appropriate contract file 3452, business entity summary file 2304 individual summary file 2209, employment file 3552 or a combination thereof is based upon an access computer system 15 receiving a unique individual identifier 220 via a communication network 17 from a reader 210 located at, in or near a threshold to a locking gate 13. See FIG. 1. Reader 210 reads or senses a unique individual identifier 220 of a personal token 200 presented by an individual 08. In a preferred embodiment, a reader 210 is capable of reading, scanning or sensing individual physiological data 2202 and/or individual behavioral data 2204 upon an individual 08 presenting a personal token 200 to a reader 210.

Figure 1:
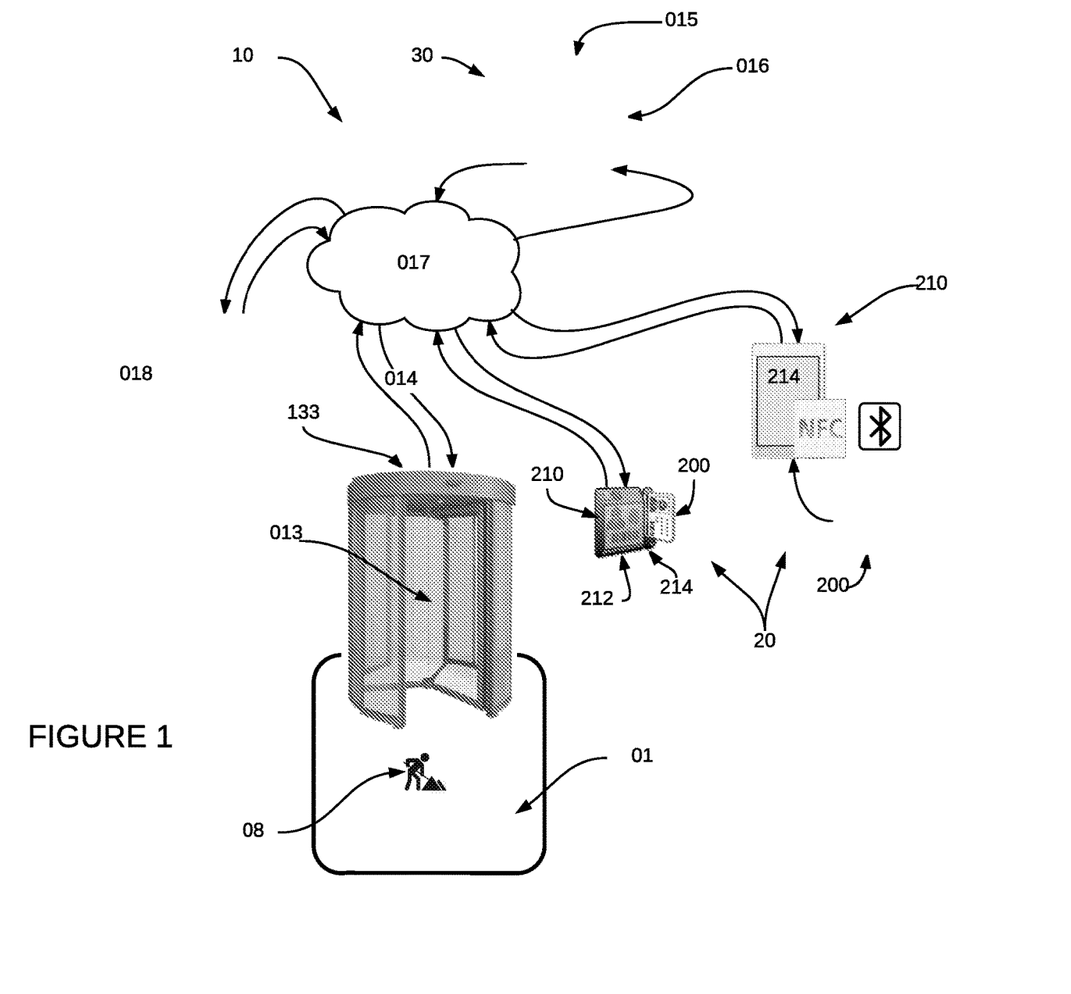
FIG. 1 is a system topology in accordance with the present disclosure of a worksite ingress/egress system 10 that includes a worksite 01, individual 08, an access computer system 15, locking gate 13 (in the form of a turnstile), actuator 133, travel signal 14, cloud server 16, communication network(s) 17, input terminal 18, identification system 20, personal token 200, reader 210, biometric reader 212 and token reader 214.

The selection of the appropriate worksite criteria file 3602 and appropriate files contract file 3452, business entity summary file 2304 individual summary file 2209, employment file 3552 or a combination thereof occurs immediately after presentment of a personal token 200. Latency between presentment of a personal token 200 and a parity check (as described above) can be reduced by co-locating access computer system 15 with reader 200 and locked gate 13. In a preferred embodiment, reader 200 and locked gate 13 are co-located but at a different location than access computer system 15. See FIG. 1. In such a configuration, duplication of hardware, files and data is reduced or eliminated when multiple locked gates 13 and readers 200 are employed. As shown in FIG. 1, the preferred embodiment further allows data within the databases 3100, 3150, 3200, 3250, 3300, 3350, 3400, 3450, 3500, 3550 and 3800 to be easily added, updated, deleted and/or maintained at one location from a variety of input terminals 18 thereby reducing the likelihood of outdated information affecting the grant or denial of passage through locked gate 13.

In a preferred embodiment, worksite ingress/egress system 10 includes an administrator manager module 305, individual management module 310, training management module 315, health management module 320, business entity management module 325, regulatory management module 330, policy management module 335, non-governmental organization (NGO) management module 340, contract management module 345, insurance management module 350, employment management module 355, worksite management module 360, communication management module 365, report management module 370, access management module 375 and handoff management module 380. See FIGS. 2 through 9.

Figure 2:
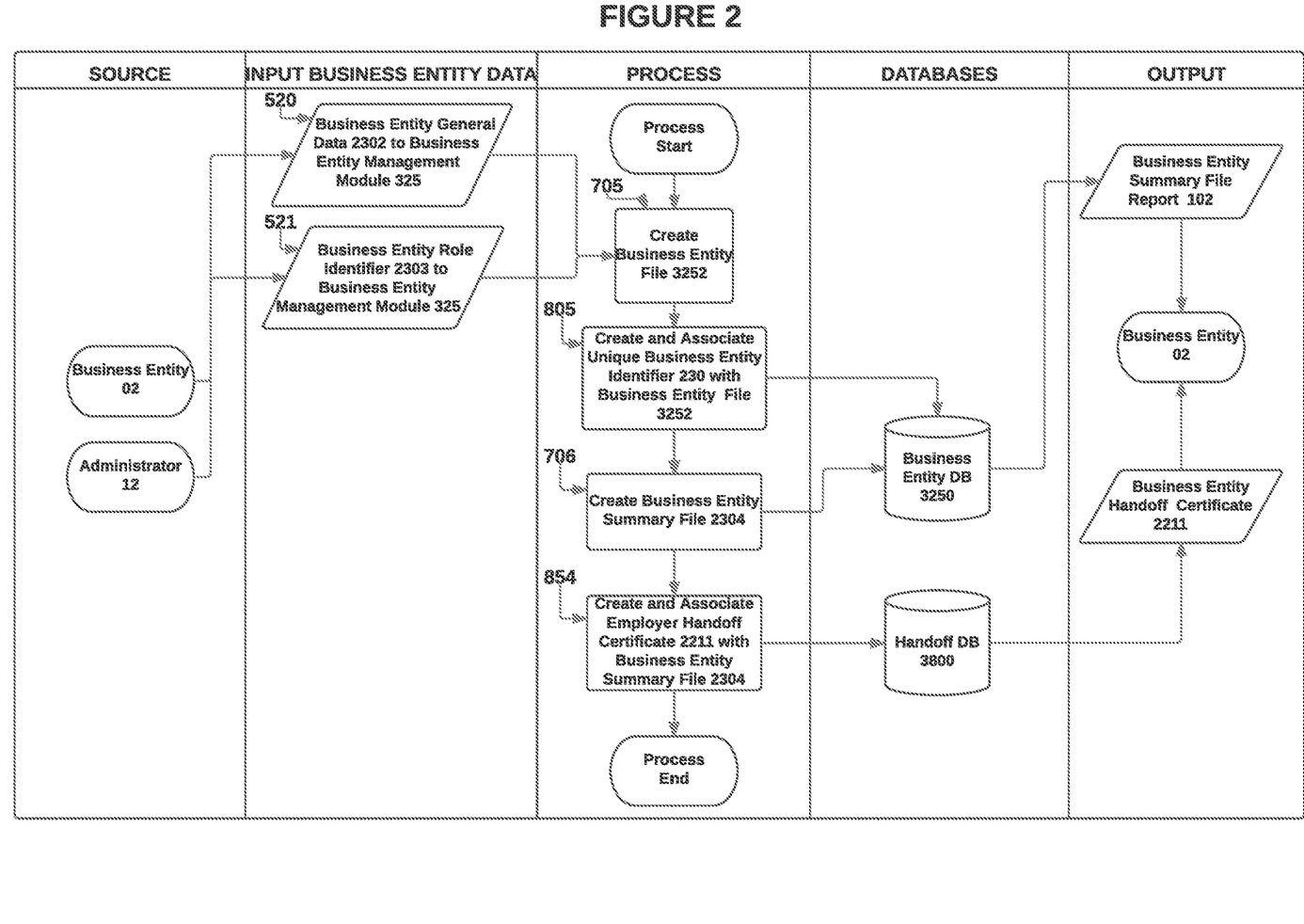
FIG. 2 is a swim lane diagram of processes of a business entity management module 325.

FIG. 2 depicts a number of processes related to a preferred embodiment of a business entity management module (BEMM) 325. A BEMM 325 handles, at a minimum, the business entity data input step 52 and in particular the steps of 520, 521 and 522 which include input and update of business entity general data 2302 and business entity role identifier 2303 for business entities 08. See FIG. 2. Business entity general data 2302 includes, but is not limited to, business name 23021, address(es) 23022, telephone number(s) 23023, email address(es) 23024, tax or employer identification number 23025, business entity user account name(s) 23026, and business entity user password(s) 23027. Business entity role identifier data 2303 includes but is not limited to type of business 23031 and list of serviced offered 23032. The business entity general data 2302 and business entity role identifier data 2303 can be entered by a business entity 02, administrator or a combination thereof. In a preferred embodiment, BEMM 325 performs a step 705 to create a business entity file 3252 in a business entity database 3250. See FIG. 2. A BEMM 325 performs a step 805 to generate and associate a unique business entity identifier (UBEI) 230 with a business entity file 3252 and stores the same in a business entity database 3250. In a preferred embodiment, BEMM 325 through a step 854 creates a business entity summary file 2304 and associates said file an employer handoff certificate 2211. See FIG. 2. Said employer handoff certificate 2211 is stored in a handoff database 3800. A handoff certificate allows a business entity 02, administrator 12 or a combination thereof to confirm and verify data 2302, 2303.

Figure 3:
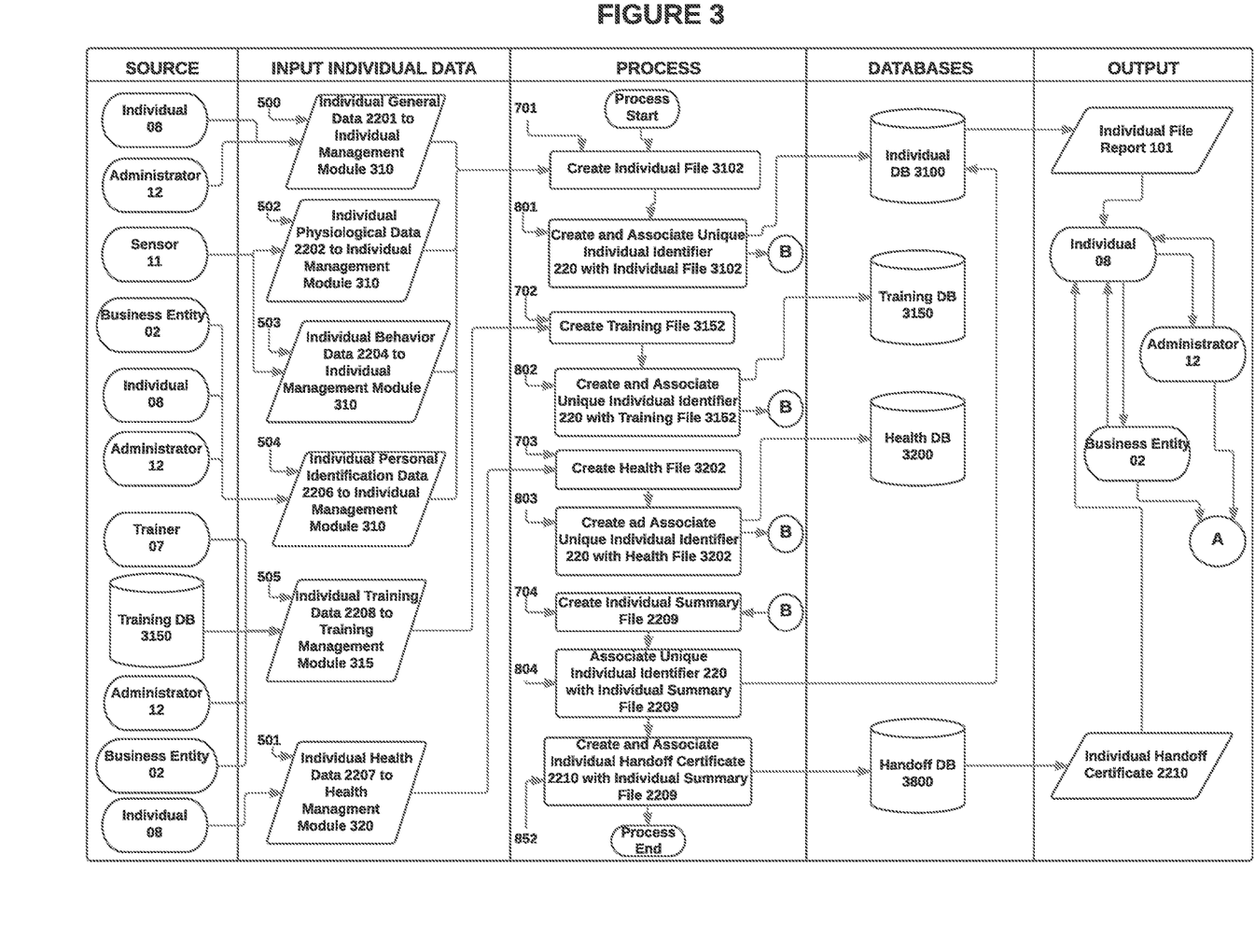
FIG. 3 is a swim lane diagram of processes of an individual management module 310, training management module 315, and health management module 320.

FIG. 3 depicts a number of processes related to a preferred embodiment of an individual management module (IMM) 310. A IMM 310 handles the input and update of information unique to an individual 08 through steps 500, 502, 503 and 504, and 506. See FIGS. 3 and 3A. Information unique to an individual 08 includes, but is not limited to, individual general data 2201, individual physiological data 2202, individual behavioral data 2204, and individual personal identification data 2206.

Individual general data 2201 includes, but not limited to, name 22011, address(es) 22012, phone number(s) 22013, email address(es) 22014, emergency contact person(s) 22015, and emergency contact phone number(s) 22016. This information can be entered by an individual 08, administrator 12 or business entity 02. See FIG. 3. Individual physiological data 2202 includes, but is not limited to fingerprint 22021, palm veins 22022, face 22023, DNA 22024, palm print 22025, hand geometry 22026, iris 22027, and retina 22028 collected by a sensor 11 adapted to collect such data. Individual behavioral data includes, but is not limited to typing rhythm 22041, gait 22042 and voice 22043 collected by a sensor 11 adapted to collect such data. Individual identification data includes but is not limited to social security number (or tax identification number) 22061, date of birth 22062, employment eligibility information 22063, number (or character string) issued by employer 22064, number (or character string) issued by regulatory authority 22065, number (or character string) issued by worksite ingress/egress system 22066, user account name 22067 and user account password 22068.

In a preferred embodiment, IMM 310 creates an individual file 3102 in an individual database 3100 through step 701, based on at least the individual general data 2201. In another embodiment, IMM 310 creates an individual file 3102 through step 701 on the individual general data 2201, individual physiological data 2202, individual behavior data 2204, and individual personal identification data 2206. The administrator 12 can select what data from the individual general data 2201, individual physiological data 2202, individual behavior data 2204, and individual personal identification data 2206 is required as a minimum to create an individual file 3102. The IMM 310 generates and associates a UII 220 with a particular individual file 3102 and stores the same in the individual database 3100 through step 801 as depicted in FIG. 3.

Figure 3A:
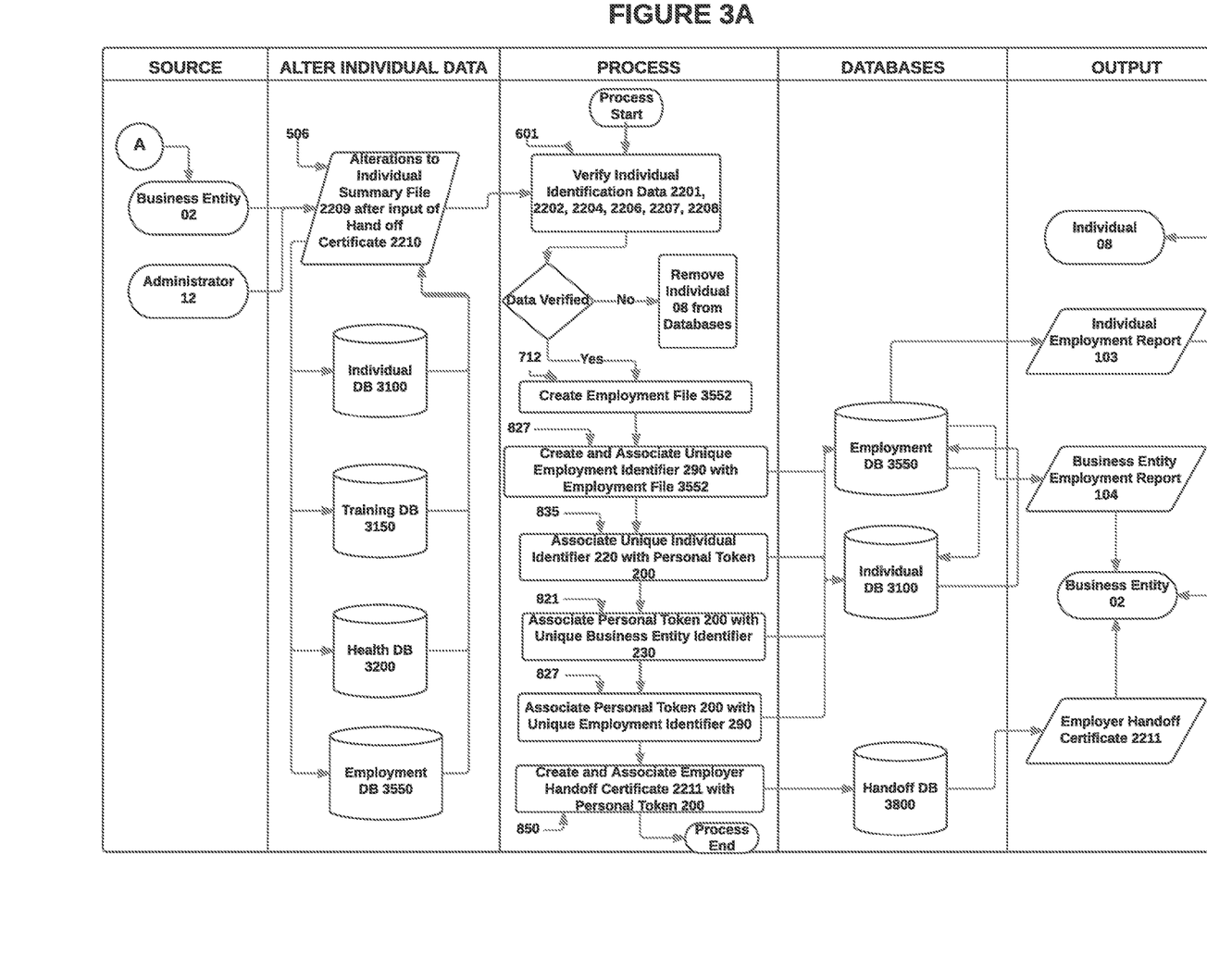
FIG. 3a is a continuation of a swim lane diagram of processes of an individual management module 310, training management module 315, and health management module 320.

FIG. 3 further depicts a number of processes related to a preferred embodiment of a health management module (HMM) 320. The HMM 320 handles the input and update of health information unique to an individual 08 through steps 501 and 506 as depicted in FIGS. 3 and 3A. Individual health data 2207 of an individual 08 includes but it not limited to height 22071, weight 22072, vision acuity 22073, blood type 22074, medication(s) 22075, allergies 22076 and vaccination(s) 22077. In a preferred embodiment, HMM 320 creates, through step 703, health file 3202 in a health database 3200 based on administrator 12 selected required data based selected from individual health data 2207 criteria. An IMM 310 generates and associates, through step 803, a UII 220 with a particular health file 3202 and stores the same in the health database 3200. In a preferred embodiment, creation of health file 3202 is subsequent to creation of individual file 3102.

FIG. 3 additionally depicts a number of processes related to a preferred embodiment of a training management module (TMM) 315. A TMM 315 handles input and update of training information unique to an individual 08 through steps 505 and 506. The training data 2208 includes, but is not limited to, the name of the training course 22081, duration of training 22082, date training started 220821, date training completed 220822, and date training expires 220823. Training data 2208 can be entered by a business entity 02, trainer 07, administrator or exported from a training database 3150. In a preferred embodiment, TMM 315 creates through step 702, a training file 3152 in a training database 3150 based on training criteria selected by an administrator 12. An IMM 310 generates and associates, through step 802, a UII 220 with a training file 3152 and stores the same in a training database 3150. In a preferred embodiment, creation of training file 3150 is subsequent to creation of individual file 3102.

Upon the association of UII 220 with individual file 3102, training file 3152, and health file 3202, IMM 310 creates through step 704, an individual summary file 2209. See FIG. 3. IMM 310 associates through step 804, a UII 220 with individual summary file 2209. See FIG. 3. In a preferred embodiment, a handoff management module (HAMM) 380 creates and associates through step 852, an individual handoff certificate 2210 with an individual summary file 2209 and stores the same in a handoff database 3800. See FIG. 3. In another embodiment, a worksite ingress/egress system 10 does not include a HAMM 380, handoff certificate 2210, handoff certificate database 3800 or a combination thereof.

As depicted in FIG. 3, a preferred embodiment of the present invention contemplates an individual handoff certificate 2210 tendered to an individual 08 and subsequently sent to a business entity 02, like an employer. A handoff certificate 2210 can be used by an individual 08, business entity 02, administrator 12 or a combination thereof to review, verify and alter if required, data entered into the individual database 3100, training database 3150, health database 3200 or a combination thereof. See FIG. 3A. In a preferred embodiment, a business entity 02 is able to alter, through step 506, data in an individual summary file 2209 after input of an individual handoff certificate 2210. Data verification by a business entity 02 through step 601 could be online, offline or a combination thereof. For example, confirmation of basic contact details, employment eligibility, certifications, training or a combination thereof could be done offline or through a third party. Data 2201, 2201, 2204, 2206, 2207, 2208 verified by a business entity 02 is used to create through step 712 an employment file 3552. See FIG. 3A. In one embodiment, data 2201, 2201, 2204, 2206, 2207, 2208 which is not verifiable results in removal of such an individual 08 from the individual database 3100, training database 3150 and health database 3200. In another embodiment, data 2201, 2201, 2204, 2206, 2207, 2208 which is not verifiable results in flagging such an individual 08 in an individual database 3100, training database 3150 and health database 3200 for further action and notification by or to an individual 08, business entity 02 or a combination thereof.

In a preferred embodiment, a unique employment identifier (UEI) 290 is created and associated with an employment file 3552 and stored in an employment database 3550 through step 827. See FIG. 3A. In a preferred embodiment, an employment management module (EMM) 355 performs these tasks. An employment file 3552 includes but is not limited to employment general data 2900, such as employer name 29001, employer address 29002, start date 29003 and end date 29004. An employment database 3550 provides, upon a proper query, a history of employment of an individual 08, employment by a business entity 02 or a combination thereof. Input of such information can be an individual 08, business entity 02, administrator 12 or a combination thereof. In a preferred embodiment, a business entity 02, such as an employer of an individual 08 inputs employment general data 2900 after verification of individual identification data 601. See FIG. 3A.

A personal token 200 is associated with a unique individual identifier 220 through step 835; a unique business entity identifier 230 through step 821; a unique employment identifier 290 through step 827 or a combination thereof and stored in the employment database 3550, individual database 3100 or a combination thereof. See FIG. 3A. It is contemplated that personal token 200 can take many forms including but not limited to a badge with a bar code, picture, RFID chip, NFC chip, Bluetooth chip, Low Energy Bluetooth chip or a combination thereof. In a preferred embodiment, personal token 200 is an RFID badge 2001, NFC badge 2003, Bluetooth Badge 2005, Low Energy Bluetooth Badge 20051 or a combination thereof.

In a preferred embodiment, once a personal token 200 is associated with at least a unique individual identifier 220 and a unique business entity identifier 230, then a business entity handoff certificate 2211 is created and associated with said personal token 200 through step 850 by HAMM 380. See FIG. 3A. A business handoff certificate 2211 allows a business entity 02 to verify and confirm proper association of a personal token 200 with a business entity 02. This is especially useful when a personal token 200 remains with an individual as he/she is employed by various business entities 02 over time. In such an embodiment, a personal token 200 remains with a person through his/her work life. In another embodiment, a personal token 200 is held by an individual 08 during employment (or association) with a particular business entity 02 and returned to the business entity 02 upon completion of employment.

Figure 4:
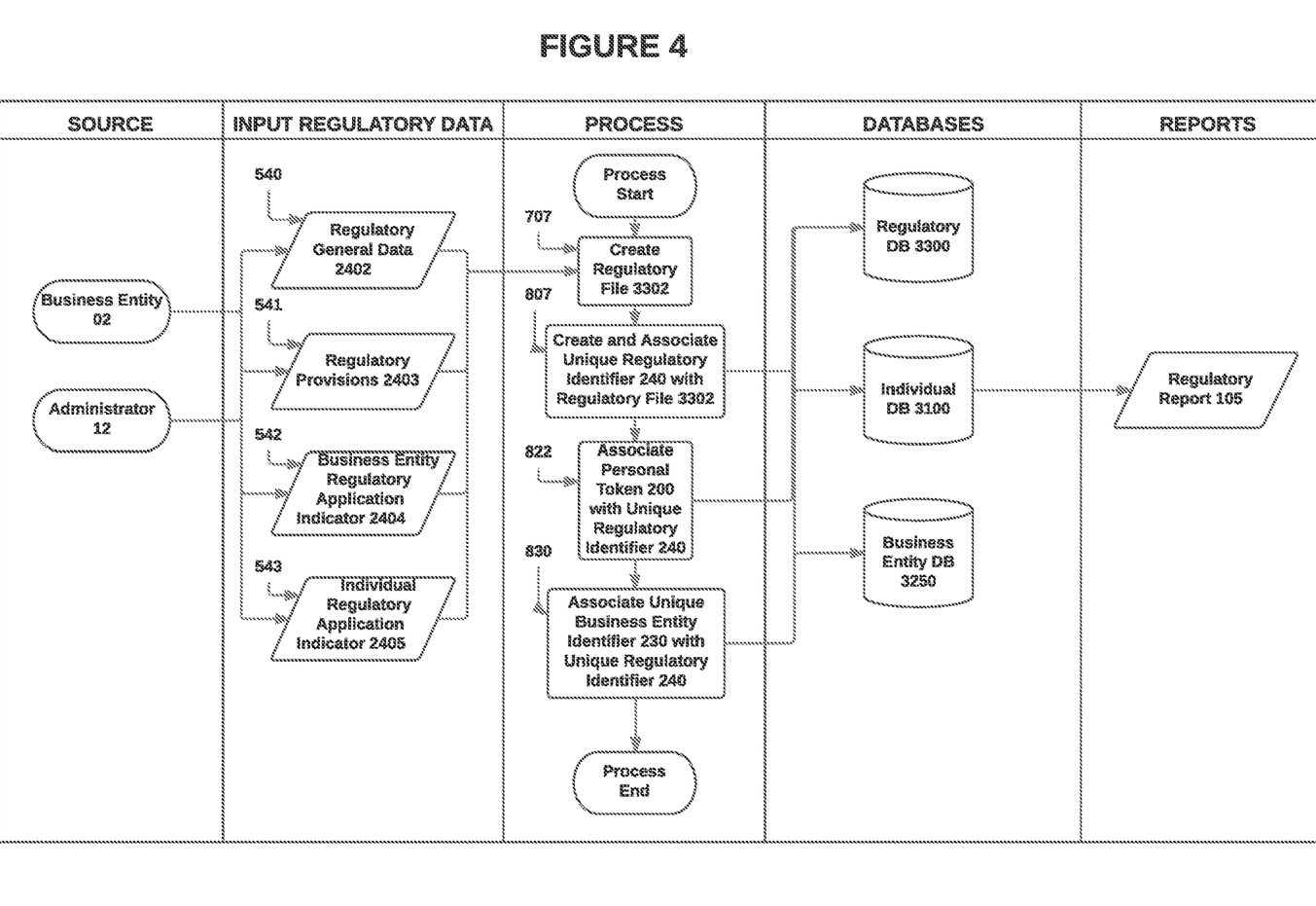
FIG. 4 is a swim lane diagram of processes of a regulatory management module 330.

FIG. 4 depicts a number of processes related to a preferred embodiment of a regulatory management module (RMM) 330. A RMM 330 handles the input and update of regulatory information relevant to the worksite 01, business entity 02, and individual 08 through steps 540, 541, 542 and 543. See FIG. 4. Regulatory information includes but is not limited to regulatory general data 2402, regulatory provisions 2403, business entity regulation applicability indicator 2404 and individual regulation applicability indicator 2405. Regulatory general data 2402 includes but is not limited to the regulatory source(s) 24021, address(es) 24022, telephone number(s) 24023 and email address(es) 24024. Regulatory provisions 2403 contemplates but is not limited to the text of a regulation 24031. An indicator 2404, 2405 associates applicability of a particular regulatory provision 2403 to a business entity 02, individual 08 or a combination thereof. Regulatory general data 2402, regulatory provisions 2403 and indicators 2404, 2405 can be entered by a business entity 02, trainer 07, administrator 12 or a combination thereof. In a preferred embodiment, RMM 330 creates a regulatory file 3302 through step 707; and associates a URI 240 for storage in and retrieval from a regulatory database 3300 as part of step 807. A RMM 330 through step 822 further associates and stores in an individual database 3100, a URI 240 with a personal token 200 based on criteria selected by an administrator 12, business entity 02, or a combination thereof. Likewise, a RMM 330 through step 830 associates and stores in an business entity database 3250, a URI 240 with a unique business entity identifier 230 based on criteria selected by an administrator 12, business entity 02, or a combination thereof. See FIG. 4.

Figure 5:
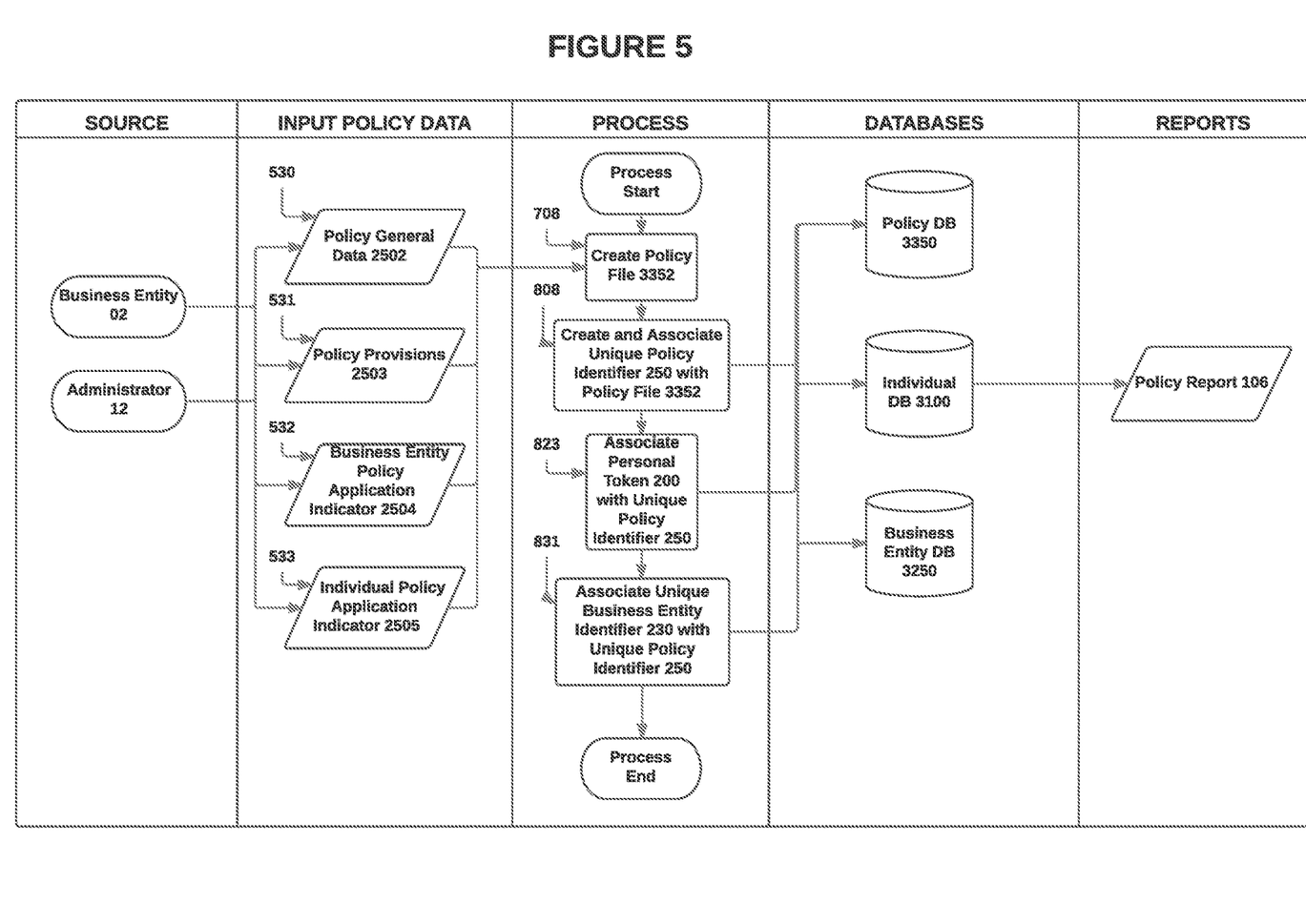
FIG. 5 is a swim lane diagram of processes of a policy management module 335.

FIG. 5 depicts a number of processes related to a preferred embodiment of a policy management module (PMM) 335. A PMM 335 handles the input and update of policies of employers relevant to a worksite 01, business entity 02, and individual 08 through steps 530, 531, 532 and 533. See FIG. 5. Policy information includes but is not limited to policy general data 2502, policy provisions 2503, business entity policy applicability indicator 2504 and individual policy applicability indicator 2505. Policy general data 2502 includes but is not limited to the source of the policy 25021, source address(es) 25022, telephone number(s) 25023 and email address(es) 25024. Policy provisions 2503 contemplates but is not limited to the text of a policy 25031. An indicator 2504, 2505 associates applicability of a particular policy 2503 to a business entity 02, individual 08 or a combination thereof. Policy general data 2502, policy provisions 2503 and indicators 2504, 2505 can be entered by a business entity 02, trainer 07, administrator 12 or a combination thereof. In a preferred embodiment, PMM 335 through step 708 creates a policy file 3352; and through step 808 associates a UPI 250 with policy file 3352 for storage in and retrieval from a policy database 3350. See FIG. 5. A PMM 335 through step 823 further associates and stores in an individual database 3100, a UPI 250 with a personal token 200 based on criteria selected by an administrator 12, business entity 02, or a combination thereof. Likewise, a PMM 335 through step 831 associates and stores in a business entity database 3250, a UPI 250 with a unique business entity identifier 230 based on criteria selected by an administrator 12, business entity 02, or a combination thereof. See FIG. 5.

Figure 6:
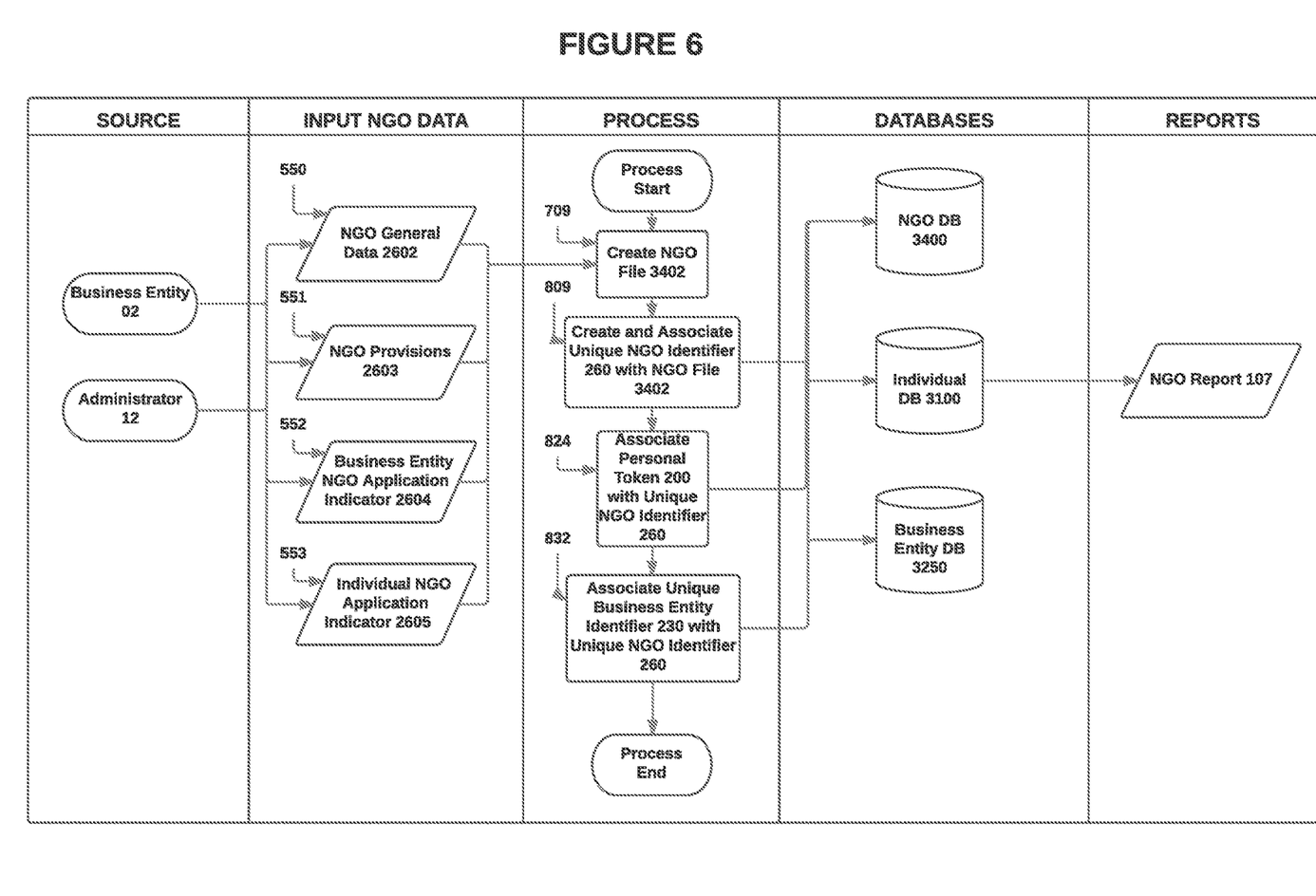
FIG. 6 is a swim lane diagram of processes of a NGO management module 340.

FIG. 6 depicts a number of processes related to a preferred embodiment of a non-governmental organization (NGO) management module (NMM) 340. A NMM 340 handles the input and update of NGO policies, guidelines and rules relevant to a worksite 01, business entity 02, and individual 08 through steps 550, 551, 552, and 553. See FIG. 6. NGO Policy information includes but is not limited to NGO general data 2602, NGO policy/guidelines/rules provisions 2603, business entity guideline applicability indicator 2604 and individual guideline applicability indicator 2605. NGO general data 2602 includes but is not limited to the source of the policy/guidelines/rules 26021, source address(es) 26022, telephone number(s) 26023 and email address(es) 26024. NGO policy/guidelines/rules provisions 2603 contemplates but is not limited to the text of a policy/guideline/rule 26031. An indicator 2604, 2605 associates applicability of a particular NGO policy/guideline/rule provision 2603 to a business entity 02, individual 08 or a combination thereof. NGO general data 2602, NGO policy/guidelines/rules provisions 2603 and indicators 2504, 2505 can be entered by a business entity 02, trainer 07, administrator 12 or a combination thereof. In a preferred embodiment, NMM 340 through step 709 creates a NGO file 3402; and in step 809 creates and associates a UNI 260 with NGO file 3402 for storage in and retrieval from a NGO database 3400. A NMM 340 further associates and stores in an individual database 3100 through step 824, a UNI 260 with a personal token 200 based on criteria selected by an administrator 12, business entity 02, or a combination thereof. Likewise, a NMM 340 through step 832 associates and stores in an business entity database 3250, a UNI 260 with a unique business entity identifier 230 based on criteria selected by an administrator 12, business entity 02, or a combination thereof. See FIG. 6.

Figure 7:
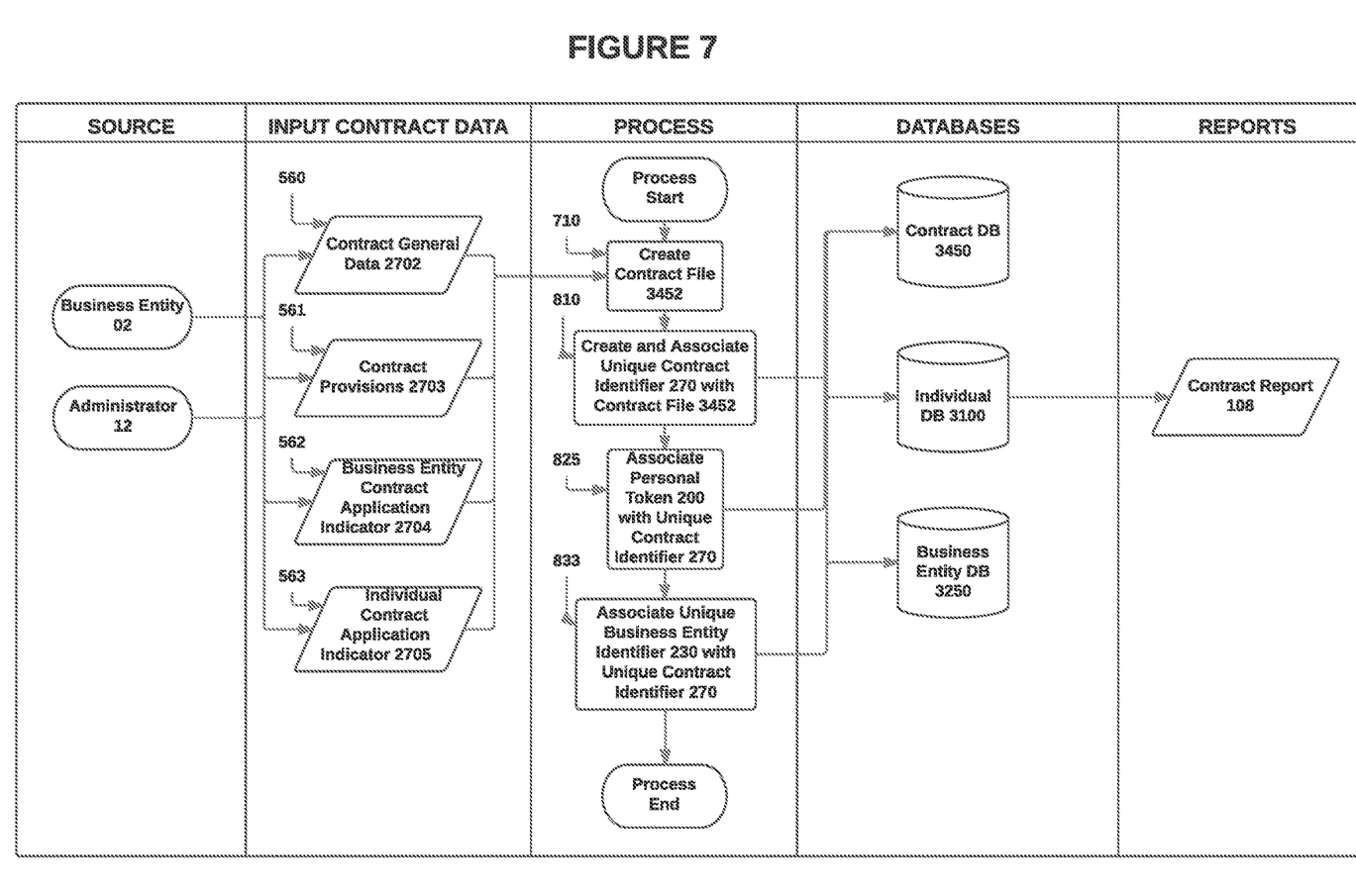
FIG. 7 is a swim lane diagram of processes of a contract management module 345.

FIG. 7 depicts a number of processes related to a preferred embodiment of a contract management module (CMM) 345. A CMM 345 handles the input and update of contract requirements relevant to a worksite 01, business entity 02, and individual 08 through step 560, 561, 562, and 563. See FIG. 7. Contract information includes but is not limited to contract general data 2702, contract provisions 2703, business entity contract applicability indicator 2704 and individual contract applicability indicator 2705. Contract general data 2702 includes but is not limited to the source of the parties to the contract 27021, duration of contract 27022, contract start date 270221, contract end date 270222, worksite location(s) 27023, telephone number(s) of the parties to the contract 27024 and email address(es) 27025. Contract provisions 2703 contemplates but is not limited to the text of a contractual provision 27031. An indicator 2704, 2705 associates applicability of a contractual provision 2703 to a worksite 01, business entity 02, individual 08 or a combination thereof. Contract general data 2702, contract provisions 2703 and indicators 2704, 2705 can be entered by a business entity 02, trainer 07, administrator 12 or a combination thereof. In a preferred embodiment, CMM 345 through step 710 creates a contract file 3452; and thereafter through step 810 creates and associates a UCI 270 with contract file 3452 for storage in and retrieval from a contract database 3450. A CMM 345 through step 825 further associates and stores in an individual database 3100, a UCI 270 with a personal token 200 based on criteria selected by an administrator 12, business entity 02, or a combination thereof. Likewise, a CMM 345 through step 833 associates and stores in an business entity database 3250, a UCI 270 with a unique business entity identifier 230 based on criteria selected by an administrator 12, business entity 02, or a combination thereof. See FIG. 7.

Figure 8:
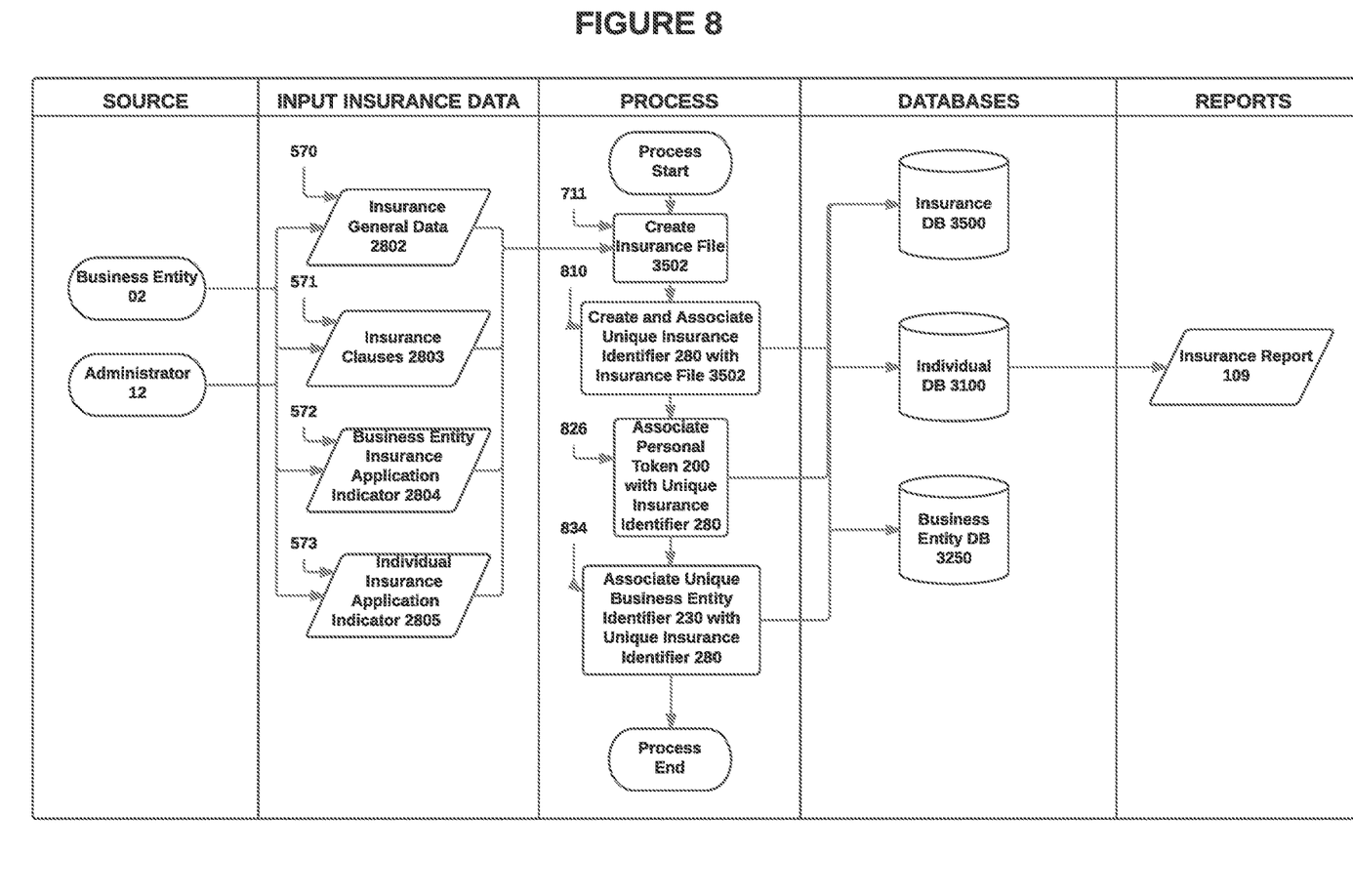
FIG. 8 is a swim lane diagram of processes of an insurance management module 350.

FIG. 8 depicts a number of processes related to a preferred embodiment of an insurance management module (INMM) 350. The INMM 350 handles the input and update of insurance requirements relevant to a worksite 01, business entity 02, and individual 08 through steps 570, 571, 572 and 573. Insurance information includes but is not limited to insurance general data 2802, insurance clauses 2803, business entity insurance applicability indicator 2804 and individual insurance applicability indicator 2805. Insurance general data 2802 includes but is not limited to the details of the insurer 28021, details of the assured 28022, details of the additional assureds 28023, policy limits 28024, insurance start date 28025, and insurance end date 28026. Insurance clauses 2803 contemplates but is not limited to the text of an insurance clause 28031, such as what is covered and what is excluded. An indicator 2804, 2805 associates applicability of an insurance clause 2803 to a worksite 01, business entity 02, individual 08 or a combination thereof. Insurance general data 2802, insurance clauses 2803 and indicators 2804, 2805 can be entered by a business entity 02, trainer 07, administrator 12 or a combination thereof. In a preferred embodiment, INMM 350 through step 711 creates an insurance file 3502; and thereafter through step 810 creates and associates a UINI 280 with insurance file 3502 for storage in and retrieval from an insurance database 3500. An INMM 350 through step 826 further associates and stores in an individual database 3100, a UINI 280 with a personal token 200 based on criteria selected by an administrator 12, business entity 02, or a combination thereof. Likewise, through step 834 an INMM 350 associates and stores in an business entity database 3250, a UINI 280 with a unique business entity identifier 230 based on criteria selected by an administrator 12, business entity 02, or a combination thereof. See FIG. 8.

Figure 9:
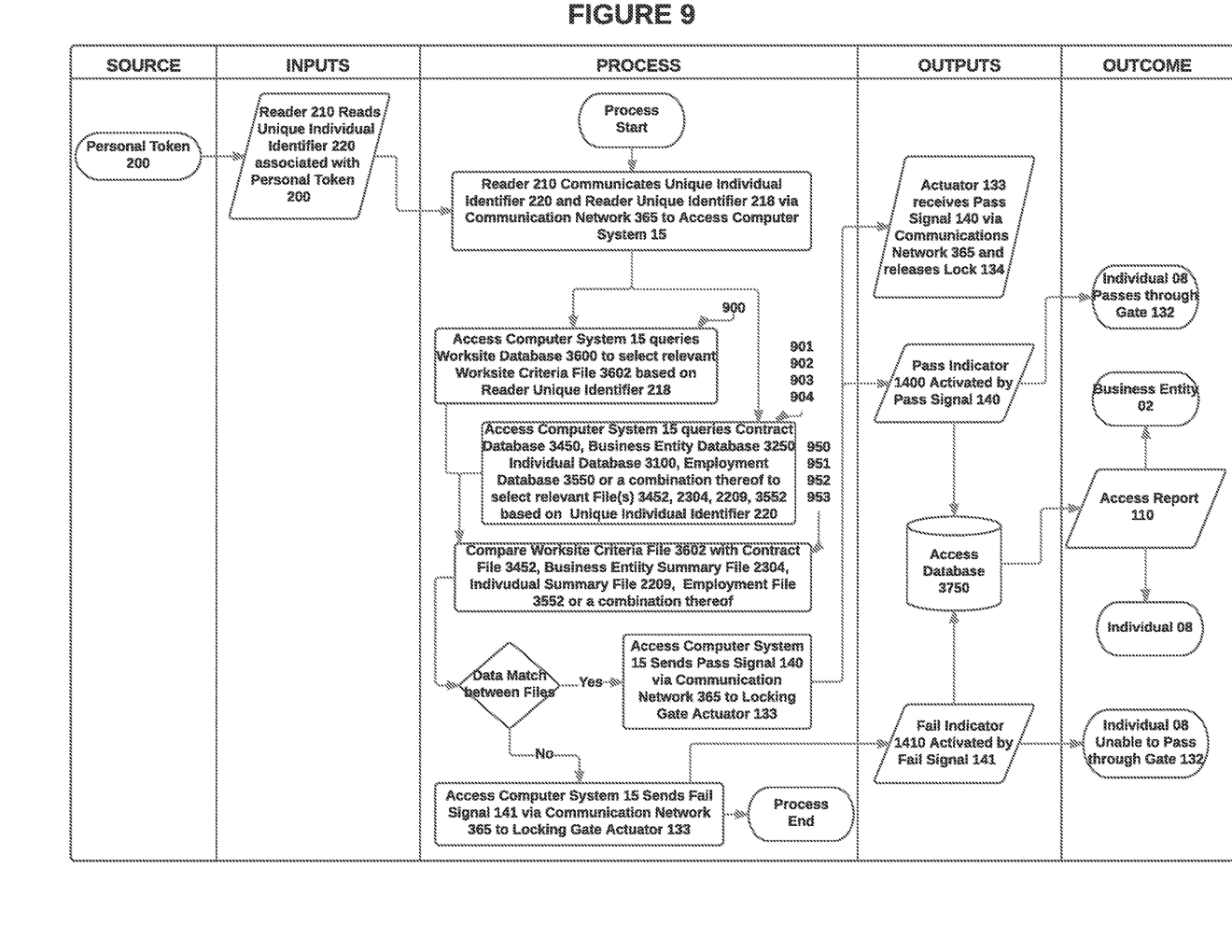
FIG. 9 is a swim lane diagram for granting or denying passage through a locked gate 13 based on a comparison of worksite criteria file 3602 with contract file 3452, business entity summary file 2304, individual summary file 2209 and employment file 3552.

FIG. 9 depicts a number of processes related to a preferred embodiment of a worksite management module (WMM) 360. A WMM 360 handles the input, creation and update of information relevant to a worksite 01. The WMM 360 further handles the input, creation and update of a worksite criteria file 3602. Worksite information includes but is not limited to worksite general data 2950 including but not limited to name of the location 29501, address(es) of the location 29502, latitude and longitude of location 29503, relevant contact details 29504, type of reader(s) 210, token reader unique identifier(s) 218 and token reader location(s) 2181. A worksite criteria file 3602 is created through the WMM 360 by a business entity 02, administrator 12 or a combination thereof by entering requirements for an individual 08, business entity 02 or trainer 07 to gain access to a worksite 01 or a portion thereof. In a preferred embodiment, a worksite criteria file 3602 would include requirements related to: (1) eligibility of an individual 08 to work within the country where the worksite 01 is located; training of an individual 08 by an approved trainer 07; health of an individual 08; certification(s) held by an individual; employed by an authorized employer; minimum insurance requirements of a business entity 02 employing an individual 08; current contract relationship with business entity 02 employing an individual 08; compliance with NGO guidelines; compliance with agency regulations; business entity policies or a combination thereof. In a preferred embodiment, a worksite criteria file 3602 is associated with a token reader unique identifier 218.

Once a worksite criteria file 3602 is associated with a token reader unique identifier 218, a personal token 200 is presented to and read by a reader 210. In a preferred embodiment, reader 210 reads and communicates the unique individual identifier 220 along with the reader unique identifier 218 via a communication network 365 to an access management module (ACMM) 375 of an access computer system 15. See FIGS. 1 and 9. Communication network 365 can be wired, wireless or a combination thereof. In a preferred embodiment, a separate authentication step is initiated by a reader 210 capable of sensing and communicating individual physiological data 2202, individual behavioral data 2204 or a combination thereof at or near the same time as unique individual identifier 220 and reader unique identifier 218 information is communicated via a communication network 365 to an access computer system 15. See FIG. 1.

Upon receipt of at least a unique individual identifier 220 and a reader unique identifier 218, ACMM 375 through step 900 queries a worksite database 3600 to select relevant worksite criteria file 3602; and through steps 901, 902, 903 and 904 queries a contract database 3450, business entity database 3250, individual database 3100, employment database 3550 or a combination thereof to select relevant file(s) based upon unique individual identifier 220. Thereafter, worksite criteria file 3602 and contract file 3452, business entity file summary file 2304, individual summary file 2209, employment file 3552 or a combination thereof are compared for parity by ACMM 375 through steps 950, 951, 952 and 953. If parity exists, ACMM 375 through access computer system 15 sends a pass signal 140 via communication network 365 to locking gate actuator 133. See FIG. 1. Upon receipt of a pass signal 140, locking gate actuator 133 releases lock 134 and pass indicator 1400 is activated to allow and signal individual 08 that passage through gate 13. If parity does not exist between a worksite criteria file 3602 and contract file 3452, business entity file summary file 2304, individual summary file 2209, employment file 3552 or a combination thereof, then ACMM 375 on access computer system 15 sends a fail signal 141 via communication network 365 to activate fail indicator 1410 and signal individual 08 that passage through gate 13 is not allowed. In a preferred embodiment, pass and fail signals 140, 141 are stored in an access database along with the time and unique individual identifier 220 and reader unique identifier 218.

Figure 1A:
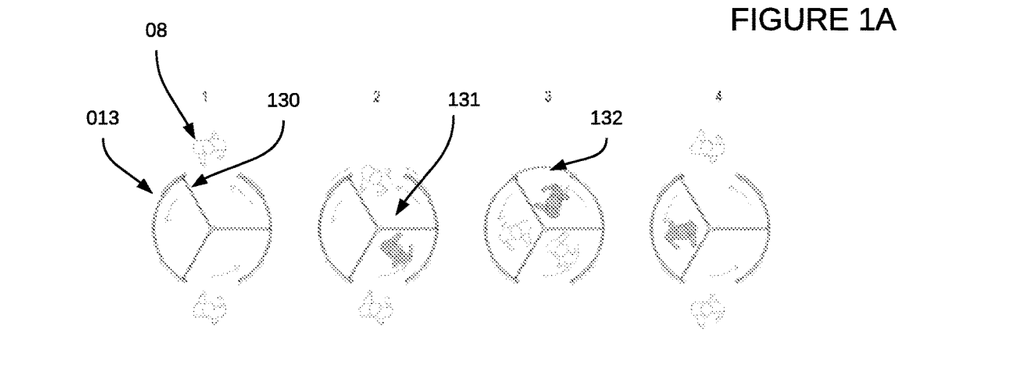
FIG. 1a is a top view of a locking gate 13 (in the form of a turnstile 130) with a vestibule 131, and door 132 depicting allowed and denied passage of an individual 08 through a locked gate 13.

FIG. 1A depicts an embodiment of a locking gate 13 with a vestibule 131 containing a turnstile 130 and a set of doors 132 capable of being in a locked or unlocked position depending upon actuator 133. Actuator 133 is energized by a travel signal 14 which can be a pass signal 140 or a fail signal 141. Travel signal 14 is sent by access computer system 15 via a communications network 17.

A communication management module (COMMM) 390 is configured to communicate data, information or signals between access computer system 15, identification system 20, and access authorization system 30. Transmission of data, information or signals can be achieved over copper wires, fiber optic cable, radio, satellite, cellular phone or other data communication means. In a preferred embodiment, COMMM 390 encrypts data, information or signals transmitted within or between computer system 15, identification system 20 and access authorization system 30.

A report management module (RPTMM) 370 is configured to arrange, format, organize and report query results of or data from databases 3100, 3150, 3200, 3250, 3300, 3350, 3400, 3450, 3500, 3550 and 3800 in user defined structures for transmission via COMMM 390 to individual 08, business entity 02, administrator 12 or a combination thereof. For example, RPTMM 370 can generate and transmit a report of individuals 08 that met or failed to meet a worksite criteria file 3602. Such a report can be sent via COMMM 390 to a terminal 18 or other device capable of displaying report. In another example, RPTMM 370 can generate and transmit a report from an individual database 3100 about a particular individual 08 to a business entity 02 or individual 08 via COMMM 390. RPTMM 370 can be configured to generate and send a notification to a business entity 08 of the number of employees within a worksite at user selected time intervals or specific times. RPTMM 370 in a preferred embodiment is capable of reporting: (1) a list of personnel in a worksite 01; (2) time lines of ingress/egress based on name of individual 08 or name of business entity 02; (3) time left to renew or comply with worksite criteria; and (4) other user define reports relevant to worksite 01 access. Worksite criteria can be in the form of: (1) relevant regulatory requirements directed to business entities 02 (such as contractors, sub-contractors and vendors), individuals 08, or a combination thereof; (2) relevant insurance or self-insurance requirements of a business entity 02; or (3) relevant contract requirements agreed to by business entities 02. In a preferred embodiment, RPTMM 370 generates a business entity summary file report 102 (see FIG. 2), individual report 101 (see FIG. 3), individual employment report 103 (see FIG. 3A), business entity employment report 104 (See FIG. 3A), regulatory report 105 (see FIG. 4), policy report 106 (See FIG. 5), NGO report 107 (see FIG. 6), contract report 108 (See FIG. 7), insurance report 109 (see FIG. 8), access report 110 (see FIG. 9).

In a preferred embodiment, an administrator management module (AMM) 305 is included in an access authorization system 30. An AMM 305 allows for the input and update of information unique to the administration of a worksite ingress/egress system 10. It includes data to provide super user rights to access, enter or alter data from all databases 3100, 3150, 3200, 3250, 3300, 3350, 3400, 3450, 3500, 3550 and 3800 and interrupt or override travel signal 14.

The above and other features of the invention including various novel method steps and a system of the various modules have been particularly described. It will be understood that the particular process and construction of parts embodying the invention by way of illustration only and not as a limitation of the invention. The principles and features of this invention may be employed in varied and numerous embodiments without departing from the scope of the invention as defined by the appended claims.

What is claimed is:

1. A computer assisted method of managing worker ingress to a worksite comprising:
   creating a plurality of individual files, storing individual data related to said plurality of individual files in a cloud computing environment;
   creating a plurality of business entity files, storing business entity data related to said plurality of business files in a cloud computing environment;
   creating a plurality of library files, wherein at least one of said plurality of library files is an insurance management library file that contains information about liability insurance policy limits which is used to determine whether to grant access to the worksite; storing user defined critical compliance data related to said plurality of library files in a cloud computing environment;
   creating an authorization system from said plurality of entity files and said library files;
   creating and linking a unique individual identifier to each of said plurality of individual files based on said data stored within a corresponding said individual files;
   creating and linking a unique business entity identifier to each of said plurality of business entity files based on said data stored with a corresponding said business entity files;
   interrogating said unique individual identifier by a reader configured to read said unique individual identifier;
   transmitting said unique individual identifier between said reader and said authorization system;
   determining by a computer, whether said individual data linked by said unique individual identifier meets said user defined critical compliance data contained within said plurality of said library files;
   creating and storing a critical criteria file for each of said interrogations into a critical access file;
   sending a permission or denial signal to a locked gate to allow or deny an individual to pass through said locked gate.

* * * * *